United States Patent
Ananthanarayanan et al.

(10) Patent No.: US 6,847,001 B2
(45) Date of Patent: Jan. 25, 2005

(54) METHOD FOR METALLURGICALLY JOINING A TUBE TO A MEMBER

(75) Inventors: Venkatasubramanian Ananthanarayanan, Beavercreek, OH (US); Dharmendra M. Ramachandra, Centerville, OH (US); Douglas J. Heller, Springboro, OH (US); Michael H. Froning, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 147 days.

(21) Appl. No.: 10/226,179

(22) Filed: Aug. 22, 2002

(65) Prior Publication Data

US 2004/0035832 A1 Feb. 26, 2004

(51) Int. Cl.[7] .............................................. B23K 11/00
(52) U.S. Cl. ........................................ 219/59.1; 219/61
(58) Field of Search .............................. 219/59.1, 60 R, 219/61

(56) References Cited

U.S. PATENT DOCUMENTS

| | | | |
|---|---|---|---|
| 3,784,778 A | | 1/1974 | McPherson et al. |
| 4,269,106 A | | 5/1981 | Leibhard et al. |
| 4,480,166 A | * | 10/1984 | Leech .......................... 219/118 |
| 4,496,410 A | | 1/1985 | Davis et al. |
| 4,514,614 A | | 4/1985 | Stol |
| 4,677,271 A | * | 6/1987 | Opprecht ....................... 219/93 |
| 4,769,624 A | | 9/1988 | Merritt et al. |
| 5,374,800 A | | 12/1994 | Yoneda |
| 5,538,076 A | * | 7/1996 | Nishida et al. ................ 165/76 |
| 5,786,548 A | | 7/1998 | Fanucchi et al. |
| 6,287,513 B1 | | 9/2001 | Grady et al. |
| 6,390,124 B1 | | 5/2002 | Kido et al. |
| 6,539,837 B2 | | 4/2003 | Fanelli et al. |
| 6,586,110 B1 | | 7/2003 | Obeshaw |
| 6,615,488 B2 | | 9/2003 | Anders et al. |
| 6,623,048 B2 | | 9/2003 | Castel et al. |
| 6,689,981 B1 | * | 2/2004 | Ananthanarayanan et al. ... 219/59.1 |
| 6,693,251 B1 | * | 2/2004 | Ananthanarayanan et al. ... 219/59.1 |
| 6,717,091 B2 | * | 4/2004 | Ananthanarayanan et al. ... 219/59.1 |
| 2002/0008387 A1 | | 1/2002 | Vasudeva |
| 2004/0035829 A1 | * | 2/2004 | Ananthanarayanan et al. ... 219/59.1 |
| 2004/0035830 A1 | * | 2/2004 | Ananthanarayanan et al. ... 219/59.1 |
| 2004/0035832 A1 | * | 2/2004 | Ananthanarayanan et al. ... 219/59.1 |
| 2004/0035833 A1 | * | 2/2004 | Ananthanarayanan et al. ... 219/59.1 |
| 2004/0035834 A1 | * | 2/2004 | Ananthanarayanan et al. ... 219/59.1 |
| 2004/0056001 A1 | * | 3/2004 | Ananthanarayanan et al. ... 219/59.1 |

FOREIGN PATENT DOCUMENTS

JP 55-136593 10/1980

* cited by examiner

Primary Examiner—Kiley S. Stoner
(74) Attorney, Agent, or Firm—Michael D. Smith

(57) ABSTRACT

A method for metallurgically joining a tube to a member. A tube is obtained having a longitudinal axis and having an end portion, wherein the end portion includes a fold, and wherein the fold includes longitudinally-spaced-apart first and second fold portions. A member (such as, but not limited to, a plate or a second tube) is obtained. The tube and the member are disposed with the end portion contacting the member. A resistance welding current path is created through the tube and the member proximate the end portion and the end portion is relatively longitudinally moved deformingly against the member creating a weld zone which includes at least some of the end portion and at least some of the member.

22 Claims, 5 Drawing Sheets

METHOD FOR METALLURGICALLY JOINING A TUBE TO A MEMBER

TECHNICAL FIELD

The present invention relates generally to metallurgy, and more particularly to a method for metallurgically joining a tube to a member.

BACKGROUND OF THE INVENTION

Resistance welding (also known as electric-resistance welding) is a known metallurgical process wherein metal is heated by its own resistance to a semi-fused (i.e., soft) or fused (i.e., molten) state by the passage of very heavy electric currents for very short lengths of time and then welded by the application of pressure.

Conventional methods for attaching parts together include gas metal arc welding. Gas metal arc welding uses a consumable metal wire as one electrode and the parts as another electrode, and moves the consumable metal wire (or the parts) to draw an arc and weld the parts together. The welding is accompanied by a gas (such as a mixture of argon and carbon dioxide) to prevent oxidation and stabilize the arc. Such gas metal arc welding is well known. In a conventional gas metal arc welding technique, solid metal wire or metal core wire (i.e., an annular-solid wire whose core is filled with metal powder such as a mixture of metal, alloy and/or oxide powders) is used with the wire at a positive electrical welding potential and with the parts electrically grounded. The welding arc creates a molten weld puddle which results in the welding together of the parts. A ceramic ferrule is used to contain the weld puddle when needed. Gas metal arc welding requires expensive welding equipment, the molten weld puddle tends to flow away from the joint area resulting in welds of inconsistent quality, and the process requires a long cycle time between welds.

Conventional methods for attaching parts together also include friction welding. To join two tubes together end to end, one of the tubes is rotated about its longitudinal axis, and the tube ends are pressed together, wherein friction causes heating of the ends creating the weld. To join a tube to a plate, the tube is rotated about its longitudinal axis, and the tube end and the plate are pressed together, wherein friction causes heating creating the weld. Friction welding requires expensive welding equipment, and the process requires a long cycle time between welds.

What is needed is a less expensive method for metallurgically joining a tube to a member.

SUMMARY OF THE INVENTION

A first method of the invention is for metallurgically joining a tube to a member. The first method includes steps a) through d). Step a) includes obtaining a tube having a longitudinal axis and having an end portion, wherein the end portion includes a fold, and wherein the fold includes longitudinally-spaced-apart first and second fold portions. Step b) includes obtaining a member. Step c) includes, after steps a) and b), positioning the tube and the member with the end portion contacting the member. Step d) includes, after step c), creating a resistance welding current path through the tube and the member proximate the end portion and relatively longitudinally moving the end portion deformingly against the member creating a weld zone which includes at least some of the end portion and at least some of the member. In one application of the first method the member is another tube, and in a different application of the first method the member is a plate.

A second method of the invention is for metallurgically joining one tube to another tube. The second method includes steps a) through d). Step a) includes obtaining a first tube having a longitudinal axis and having a first end portion, wherein the first end portion includes a first annular fold substantially coaxially aligned with the longitudinal axis, and wherein the first annular fold includes longitudinally-spaced-apart first and second fold portions. Step b) includes obtaining a second tube having a second end portion. Step c) includes, after steps a) and b), coaxially aligning the first and second tubes and positioning the first and second tubes with the first end portion contacting the second end portion. Step d) includes, after step c), creating a resistance welding current path through the first and second tubes proximate the first and second end portions and relatively longitudinally moving the first end portion deformingly against the second end portion creating an annular weld zone which includes at least some of the first end portion and at least some of the second end portion.

A third method of the invention is for metallurgically joining a tube to a plate. The second method includes steps a) through d). Step a) includes obtaining a tube having a longitudinal axis and having an end portion, wherein the end portion includes an annular fold substantially coaxially aligned with the longitudinal axis, and wherein the annular fold includes longitudinally-spaced-apart first and second fold portions. Step b) includes obtaining a plate having first and second sides. Step c) includes, after steps a) and b), aligning the tube substantially perpendicular to the plate and positioning the tube and the plate with the end portion contacting the second side. Step d) includes, after step c), creating a resistance welding current path through the tube and the plate proximate the end portion and relatively longitudinally moving the end portion deformingly against the plate creating an annular weld zone which includes at least some of the end portion and at least some of the plate.

Several benefits and advantages are derived from one or more of the methods of the invention. Resistance welding is less expensive than gas metal arc welding or friction welding. Resistance welding also has a shorter cycle time between welds than gas metal arc welding or friction welding.

DESCRIPTION OF THE PREFERRED EMBODIMENTS

Figure 1:
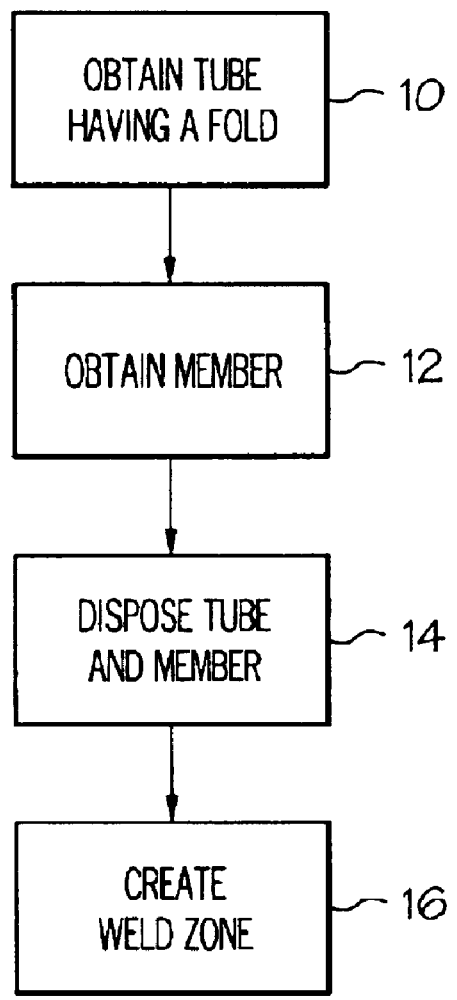
FIG. 1 is a block diagram of the first method of the invention for metallurgically joining a tube to a member.

A first method of the invention is for metallurgically joining a tube to a member and is shown in block diagram form in FIG. 1. The first method includes steps a) through d). Step a) is labeled as Obtain Tube Having A Fold" in block 10 of FIG. 1. Step a) includes obtaining a tube having a longitudinal axis and having an end portion, wherein the end portion includes a fold, and wherein the fold includes longitudinally-spaced-apart first and second fold portions. A "fold" of an end portion of a tube is a fold of the tube wall of an end portion of the tube. Step b) is labeled in block 12 of FIG. 1 as "Obtain Member". Step b) includes obtaining a member. Step c) is labeled in block 14 of FIG. 1 as "Dispose Tube and Member". Step c) includes, after steps a) and b), disposing the tube and the member with the end portion contacting the member. Step d) is labeled as "Create Weld Zone" in block 16 of FIG. 1. Step d) includes, after step c), creating a resistance welding current path through the tube and the member proximate the end portion and relatively moving the end portion deformingly against the member creating a weld zone which includes at least some of the end portion and at least some of the member. The term "proximate" includes, without limitation, the term "at". By "relatively moving" is meant moving the end portion with the member stationary or moving the member with the end portion stationary or moving both the end portion and the member, as is within the level of skill of the artisan.

In one application of the first method, such relative movement squeezes out surface contaminants from between the end portion and the member and such relative movement levels the hills and valleys between the contacting surfaces of the end portion and the member to bring surface atoms of the end portion within atomic bonding distances with surface atoms of the member. In one implementation of the first method, step d) does not melt any of the end portion and does not melt any of the member. In another implementation, step d) melts at least some of the end portion or at least some of the member or melts at least some of the end portion and at least some of the member.

In one example of the first method, the tube is a substantially right-circular cylindrical tube. In another example, the tube has a cross section which has a substantially rectangular shape, wherein the cutting plane for the cross section is perpendicular to the longitudinal axis of the tube. Other examples of the tube are left to the artisan.

In one enablement of the first method, the member is a second tube having a straight second end portion, having a second end portion having a second fold with longitudinally-spaced-apart fold portions, or having a second end portion of arbitrary shape, wherein step c) coaxially aligns the tubes end-to-end and disposes the tubes with end portion to end portion contact. In one variation, the second tube is a substantially right-circular cylindrical tube. In another variation, the second tube has a cross section which has a substantially rectangular shape, wherein the cutting plane for the cross section is perpendicular to the longitudinal axis of the second tube. In another example, the member is a plate. Other examples of members and variations of second tubes are left to the artisan.

In one embodiment of the first method, the fold is an annular fold substantially coaxially aligned with the longitudinal axis, and step d) creates an annular (or non-annular) weld zone. In one variation, the annular fold is a radially-outwardly-protruding annular fold. In another variation, the annular fold is a radially-inwardly-protruding annular fold. In the same or a different embodiment, the end portion includes at least one additional annular fold coaxially aligned with the longitudinal axis and having two longitudinally spaced-apart fold portions.

In one implementation of the first method, step d) uses a resistance-welding first electrode contacting the tube proximate the fold and a resistance-welding second electrode contacting the member. In one modification a non-electrode support is disposed inside or outside the tube, and in one example extends around the other end of the tube, to radially support the tube and/or to axially support or push the tube during step d).

In one execution of the first method, step d) does not melt any of the end portion and does not melt any of the member. In another execution of the first method, step d) melts at least some of the end portion or at least some of the member or at least some of the end portion and at least some of the member.

Figure 2:
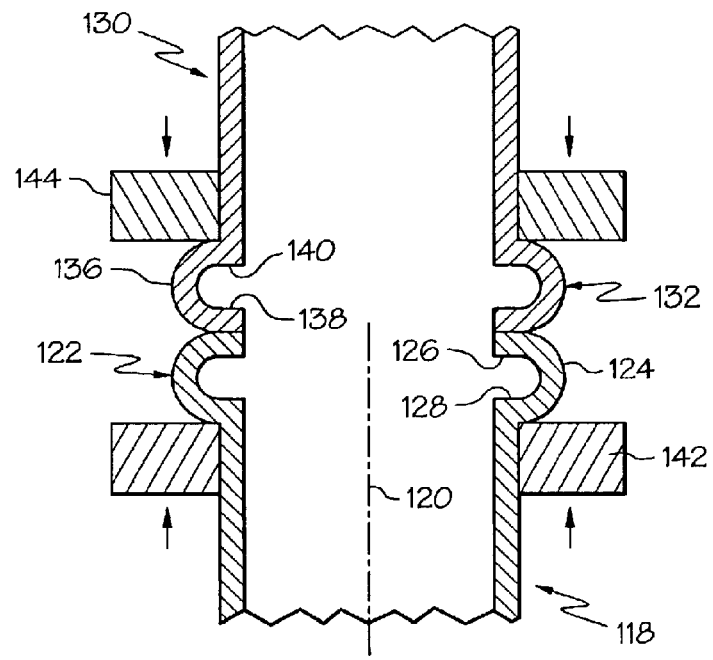
FIG. 2 is a schematic, side cross-sectional view of the first embodiment of first and second tubes and welding electrodes used in a first example of the second method, showing the tubes aligned.
Figure 3:
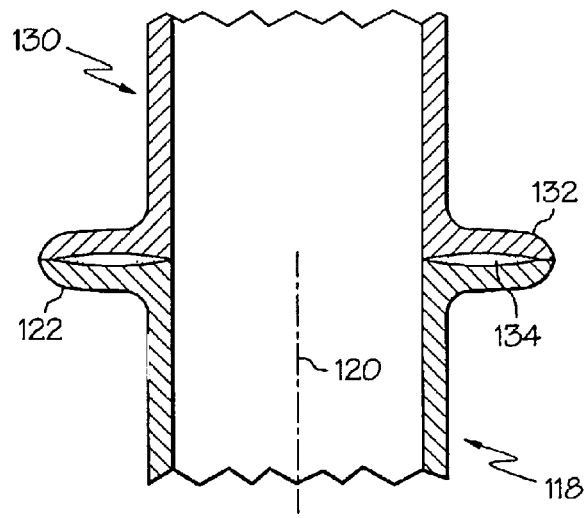
FIG. 3 is a view, as in FIG. 2, but showing the two tubes metallurgically joined together with the welding electrodes removed.

Referring to the first embodiment of FIGS. 2–3, wherein like numerals represent like elements throughout, a second method of the invention is for metallurgically joining one tube to another tube and includes steps a) through d). Step a) includes obtaining a first tube 118 having a longitudinal axis 120 and having a first end portion 122, wherein the first end portion includes a first annular fold 124 substantially coaxially aligned with the longitudinal axis 120, and wherein the first annular fold 124 includes longitudinally-spaced-apart first and second fold portions 126 and 128. Step b) includes obtaining a second tube 130 having a second end portion 132. Step c) includes, after steps a) and b), coaxially aligning the first and second tubes 118 and 130 and disposing the first and second tubes 118 and 130 with the first end portion 122 contacting the second end portion 132. Step d) includes, after step c), creating a resistance welding current path through the first and second tubes 118 and 130 proximate the first and second end portions 122 and 132 and relatively longitudinally moving the first end portion 122 deformingly against the second end portion 132 creating an annular weld zone 134 which includes at least some of the first end portion 122 and at least some of the second end portion 132.

In a first example of the second method, the second end portion 132 includes a second annular fold 136 having longitudinally spaced-apart third and fourth fold portions 138 and 140, wherein the wall thicknesses of the first and second tubes 118 and 130 are substantially equal, and wherein step c) disposes the first and second tubes 118 and 130 with the second annular fold 136 longitudinally contacting the first annular fold 126. In one variation, the first and second annular folds 124 and 136 each are radially-outwardly-protruding annular folds. In one implementation, step d) uses an annular resistance-welding first electrode 142 longitudinally contacting the first annular fold 124 and uses an annular resistance-welding second electrode 144 longitudinally contacting the second annular fold 136. Unnumbered arrows in the figures indicate the direction of relative longitudinal movement of the electrodes during step d). In one modification, the first electrode 142 longitudinally contacts the second electrode 144 at the completion of step d). This ensures that no overheating of the weld zone will occur, as can be appreciated by those skilled in the art.

In one construction for the first example of the second method, the first and second tubes 118 and 130 comprise low carbon steel such as AISI 1008 to 1010 having an outside diameter of generally 6 millimeters and a thickness of generally 2 millimeters. In one execution, pulses (totaling ⅓ of a second) of electric current of generally 5,000 amperes (and in one variation 15,000 to 20,000 amperes) are applied while applying a force of generally 300 to 800 pounds to the electrodes/support. The first, second, and/or third methods are not limited to specific materials, dimensions, electric current, and forces, as is understood by those skilled in the art. Any weldable materials such as copper, aluminum alloy, stainless steel, etc. can be used, as can be appreciated by the artisan. The particular choice of electric current, forces, and part dimensions, etc. are within the ordinary level of skill of the artisan.

Figure 4:
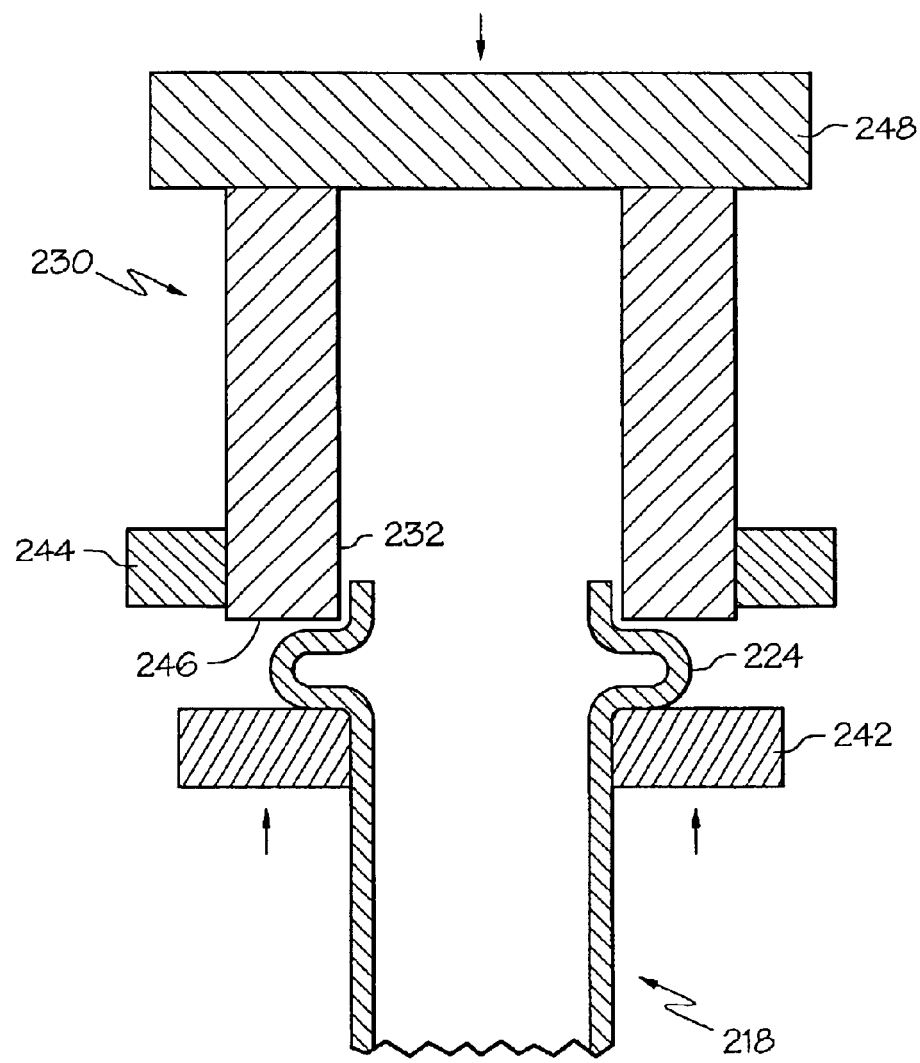
FIG. 4 is a view, as in FIG. 2, but showing a second embodiment of the tubes and welding electrodes used in a second example of the second method.

In a second example of the second method, and referring to the second embodiment of FIG. 4, the second end portion 232 of the second tube 230 is a substantially straight end portion having a substantially-longitudinally-facing annular end 246, wherein the second tube 230 has a greater wall thickness than the first tube 218, and wherein step c) disposes the first and second tubes 218 and 230 with the annular end 246 longitudinally contacting the first annular fold 224. In one application, the second tube 230 is a nut. In one variation, the first annular fold 224 is a radially-outwardly-protruding annular fold. In one implementation, step d) uses an annular resistance-welding first electrode 242 longitudinally contacting the first annular fold 224 and uses a resistance-welding second electrode 244 disposed in radial contact with the second end portion 232. In one modification, the first electrode 242 longitudinally contacts the second electrode 244 at the completion of step d). In one arrangement, a non-electrode support 248 contacts the other end of the second tube 230. In the same or another arrangement, an annular electrode, not shown, is added inside the second tube. Other arrangements of electrodes and non-electrode supports are left to the artisan.

Figure 5:
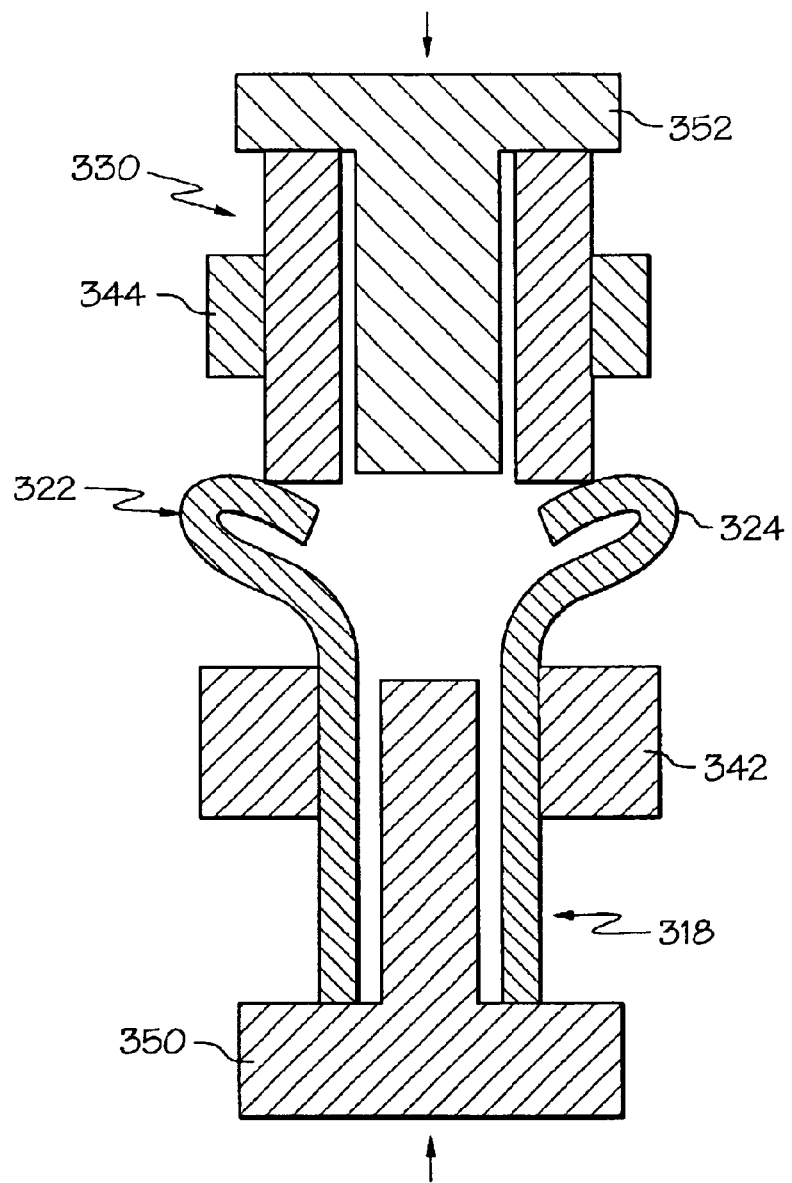
FIG. 5 is a view, as in FIG. 2, but showing a third embodiment of the tubes and welding electrodes used in an alternate second example of the second method.

In an alternate second example of the second method, and referring to the third embodiment of FIG. 5, the first annular fold 324 of the first end portion 322 of the first tube 318 protrudes radially outward and longitudinally upward as shown in the figure. The first electrode 342 is disposed outside the first tube 318, and the second electrode 344 is disposed outside the second tube 330. A non-electrode first support 350 is disposed inside the first tube 318 and extends around the other end of the first tube 318, and a non-electrode second support 352 is disposed inside the second tube 330 and extends around the other end of the second tube 330. In one variation, not shown, the positions of the first electrode and the first support are interchanged, and the positions of the second electrode and the second support are interchanged.

Other embodiments for the second method are left to the artisan. Optional examples, enablements, etc. of the first method applicable to tube-to-tube joining are equally applicable to the second method.

Figure 6:
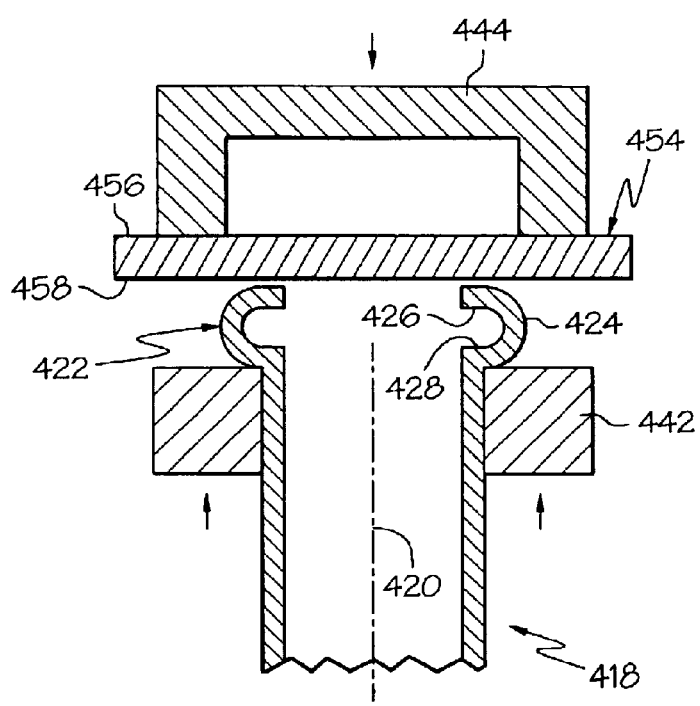
FIG. 6 is a schematic, side cross-sectional view of an embodiment of a tube, a plate, and welding electrodes used in the third method, showing the tube aligned with the plate.

Referring to the embodiment of FIG. 6, a third method of the invention is for metallurgically joining a tube to a plate and includes steps a) through d). Step a) includes obtaining a tube 418 having a longitudinal axis 420 and having an end portion 422, wherein the end portion 422 includes an annular fold 424 substantially coaxially aligned with the longitudinal axis 420, and wherein the annular fold 424 includes longitudinally-spaced-apart first and second fold portions 426 and 428. Step b) includes obtaining a plate 454 having first and second sides 456 and 458. Step c) includes, after steps a) and b), aligning the tube 418 substantially perpendicular to the plate 454 and disposing the tube 418 and the plate 454 with the end portion 422 contacting the second side 458. Step d) includes, after step c), creating a resistance welding current path through the tube 418 and the plate 454 proximate the end portion 422 and relatively longitudinally moving the end portion 422 deformingly against the plate 454 creating an annular weld zone which includes at least some of the end portion 422 and at least some of the plate 454.

In one implementation of the third method, step d) uses an annular resistance-welding first electrode 442 longitudinally contacting the annular fold 424. In the same or a different implementation, step d) uses an annular resistance-welding second electrode 444 which is substantially coaxially aligned with the longitudinal axis 420 and which longitudinally contacts the first side 456 of the plate 454 only outside an area on the first side 456 corresponding to the area on the second side 458 of the plate 454 where the annular fold 424 contacts the second side 458 of the plate 454. In one construction, the plate 454 is a sheet metal plate. Other implementations and constructions are left to the artisan. Optional examples, enablements, etc. of the first method applicable to tube-to-plate joining are equally applicable to the third method.

In one design for the first, second, and/or third method, the previously-discussed electrodes are installed in "T"-shaped electrode holders of a resistance welding machine (not shown). In one example, not shown, each electrode is formed from two sections which are brought together around the tube or on the plate and engage that tube or plate. The electrode sections have surfaces generally corresponding to the shape of the engaged portion of that tube or plate. The electrode sections are attached together before installing the electrode in the corresponding upper or lower one of the "T"-shaped electrode holders of the resistance welding machine.

Several benefits and advantages are derived from one or more of the methods of the invention. Resistance welding is less expensive than gas metal arc welding or friction welding. Resistance welding also has a shorter cycle time between welds than does gas metal arc welding or friction welding.

The foregoing description of a several methods of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

What is claimed is:

1. A method for metallurgically joining a tube to a member comprising the steps of:
    a) obtaining a tube having a longitudinal axis and having an end portion, wherein the end portion includes a fold, wherein the fold includes an inner surface, and wherein substantially no portion of the inner surface of the fold is in folded contact with any other portion of the inner surface of the fold;
    b) obtaining a member;
    c) after steps a) and b), disposing the tube and the member with the end portion contacting the member; and
    d) after step c), creating a resistance welding current path through the tube and the member proximate the end portion and relatively longitudinally moving the end portion deformingly against the member creating a weld zone which includes at least some of the end portion and at least some of the member.

2. The method of claim 1, wherein the fold is an annular fold substantially coaxially aligned with the longitudinal axis, and wherein step d) creates an annular weld zone.

3. A method for metallurgically joining a tube to a member comprising the steps of:
    a) obtaining a tube having a longitudinal axis and having an end portion, wherein the end portion includes a fold, and wherein the fold includes longitudinally-spaced-apart first and second fold portions;
    b) obtaining a member;

c) after steps a) and b), disposing the tube and the member with the end portion contacting the member; and d) after step c), creating a resistance welding current path through the tube and the member proximate the end portion and relatively longitudinally moving the end portion deformingly against the member creating a weld zone which includes at least some of the end portion and at least some of the member, wherein the fold is an annular fold substantially coaxially aligned with the longitudinal axis, wherein step d) creates an annular weld zone, and wherein the end portion includes at least one additional annular fold coaxially aligned with the longitudinal axis and having two longitudinally spaced-apart fold portions.

4. The method of claim 2, wherein the annular fold is a radially-outwardly-protruding annular fold.

5. A method for metallurgically joining a tube to a member comprising the steps of:

a) obtaining a tube having a longitudinal axis and having an end portion, wherein the end portion includes a fold, and wherein the fold includes longitudinally-spaced-apart first and second fold portions;

b) obtaining a member;

c) after steps a) and b), disposing the tube and the member with the end portion contacting the member; and d) after step c), creating a resistance welding current path through the tube and the member proximate the end portion and relatively longitudinally moving the end portion deformingly against the member creating a weld zone which includes at least some of the end portion and at least some of the member, wherein the fold is an annular fold substantially coaxially aligned with the longitudinal axis, wherein step d) creates an annular weld zone, and wherein the annular fold is a radially-inwardly-protruding annular fold.

6. The method of claim 2, wherein the tube is a substantially right-circular cylindrical tube.

7. The method of claim 2, wherein step d) uses a resistance-welding first electrode contacting the tube proximate the fold and a resistance-welding second electrode contacting the member.

8. A method for metallurgically joining a tube to a member comprising the steps of:

a) obtaining a tube having a longitudinal axis and having an end portion, wherein the end portion includes a fold, and wherein the fold includes longitudinally-spaced-apart first and second fold portions;

b) obtaining a member;

c) after steps a) and b), disposing the tube and the member with the end portion contacting the member; and d) after step c), creating a resistance welding current path through the tube and the member proximate the end portion and relatively longitudinally moving the end portion deformingly against the member creating a weld zone which includes at least some of the end portion and at least some of the member, wherein the fold is an annular fold substantially coaxially aligned with the longitudinal axis, wherein step d) creates an annular weld zone, and wherein step d) does not melt any of the end portion and does not melt any of the member.

9. A method for metallurgically joining one tube to another tube comprising the steps of:

a) obtaining a first tube having a longitudinal axis and having a first end portion, wherein the first end portion includes a first annular fold substantially coaxially aligned with the longitudinal axis, wherein the first annular fold includes an inner surface, and wherein substantially no portion of the inner surface of the first annular fold is in folded contact with any other portion of the inner surface of the first annular fold;

b) obtaining a second tube having a second end portion;

c) after steps a) and b), coaxially aligning the first and second tubes and disposing the first and second tubes with the first end portion contacting the second end portion; and d) after step c), creating a resistance welding current path through the first and second tubes proximate the first and second end portions and relatively longitudinally moving the first end portion deformingly against the second end portion creating an annular weld zone which includes at least some of the first end portion and at least some of the second end portion.

10. The method of claim 9, wherein the second end portion is a substantially straight end portion having a substantially-longitudinally-facing annular end, wherein the second tube has a greater wall thickness than the first tube, and wherein step c) disposes the first and second tubes with the annular end longitudinally contacting the first annular fold.

11. The method of claim 10, wherein the first annular fold is a radially-outwardly-protruding annular fold.

12. The method of claim 10, wherein step d) uses an annular resistance-welding first electrode longitudinally contacting the first annular fold and uses a resistance-welding second electrode disposed in radial contact with the second end portion.

13. The method of claim 12, wherein the first electrode longitudinally contacts the second electrode at the completion of step d).

14. A method for metallurgically joining one tube to another tube comprising the steps of:

a) obtaining a first tube having a longitudinal axis and having a first end portion, wherein the first end portion includes a first annular fold substantially coaxially aligned with the longitudinal axis, and wherein the first annular fold includes longitudinally-spaced-apart first and second fold portions;

b) obtaining a second tube having a second end portion;

c) after steps a) and b), coaxially aligning the first and second tubes and disposing the first and second tubes with the first end portion contacting the second end portion; and d) after step c), creating a resistance welding current path through the first and second tubes proximate the first and second end portions and relatively longitudinally moving the first end portion deformingly against the second end portion creating an annular weld zone which includes at least some of the first end portion and at least some of the second end portion, wherein the second end portion includes a second annular fold having longitudinally spaced-apart third and fourth fold portions, wherein the wall thicknesses of the first and second tubes are substantially equal, and wherein step c) disposes the first and second tubes with the second annular fold longitudinally contacting the first annular fold.

15. The method of claim 14, wherein the first and second annular folds each are radially-outwardly-protruding annular folds.

16. The method of claim 15, wherein step d) uses an annular resistance-welding first electrode longitudinally contacting the first annular fold and uses an annular resistance-welding second electrode longitudinally contacting the second annular fold.

17. The method of claim 16, wherein the first electrode longitudinally contacts the second electrode at the completion of step d).

18. A method for metallurgically joining a tube to a plate comprising the steps of:
   a) obtaining a tube having a longitudinal axis and having an end portion, wherein the end portion includes an annular fold substantially coaxially aligned with the longitudinal axis, and wherein the annular fold include an inner surface, and wherein substantially no portion of the inner surface of the fold is in folded contact with any other portion of the inner surface of the fold;
   b) obtaining a plate having first and second sides;
   c) after steps a) and b), aligning the tube substantially perpendicular to the plate and disposing the tube and the plate with the end portion contacting the second side; and
   d) after step c), creating a resistance welding current path through the tube and the plate proximate the end portion and relatively longitudinally moving the end portion deformingly against the plate creating an annular weld zone which includes at least some of the end portion and at least some of the plate.

19. The method of claim 18, wherein step d) uses an annular resistance-welding first electrode longitudinally contacting the annular fold.

20. The method of claim 19, wherein step d) uses an annular resistance-welding second electrode which is substantially coaxially aligned with the longitudinal axis and which longitudinally contacts the first side of the plate only outside an area on the first side corresponding to the area on the second side of the plate where the annular fold contacts the second side of the plate.

21. A method for metallurgically joining a tube to a member comprising the steps of:
   a) obtaining a tube having a longitudinal axis and having an end portion, wherein the end portion includes a fold, and wherein the fold includes an inner surface having opposing, substantially parallel, and longitudinally-spaced-apart first and second surface portions;
   b) obtaining a member;
   c) after steps a) and b), disposing the tube and the member with the end portion contacting the member; and
   d) after step c), creating a resistance welding current path through the tube and the member proximate the end portion and relatively longitudinally moving the end portion deformingly against the member creating a weld zone which includes at least some of the end portion and at least some of the member.

22. A method for metallurgically joining a tube to a member comprising the steps of:
   a) obtaining a tube having a longitudinal axis and having an end portion, wherein the end portion includes a fold, and wherein the fold includes an inner surface having opposing first and second surface portions which are longitudinally spaced apart and which have a radial extent greater than the wall thickness of the tube;
   b) obtaining a member;
   c) after steps a) and b), disposing the tube and the member with the end portion contacting the member; and
   d) after step c), creating a resistance welding current path through the tube and the member proximate the end portion and relatively longitudinally moving the end portion deformingly against the member creating a weld zone which includes at least some of the end portion and at least some of the member.

* * * * *